(12) United States Patent
Madsen et al.

(10) Patent No.: US 11,028,826 B2
(45) Date of Patent: Jun. 8, 2021

(54) VORTEX GENERATOR DEVICE FOR A WIND TURBINE BLADE

(71) Applicant: LM WIND POWER US TECHNOLOGY APS, Kolding (DK)

(72) Inventors: Jesper Madsen, Gesten (DK); Jesper Høeg, Kolding (DK); Kim Ansholm Rasmussen, Kolding (DK); Danny Kedochim, Kolding (DK)

(73) Assignee: LM WIND POWER US TECHNOLOGY APS, Kolding (DK)

( * ) Notice: Subject to any disclaimer, the term of this patent is extended or adjusted under 35 U.S.C. 154(b) by 0 days.

(21) Appl. No.: 16/330,984

(22) PCT Filed: Sep. 6, 2017

(86) PCT No.: PCT/EP2017/072367
§ 371 (c)(1),
(2) Date: Mar. 6, 2019

(87) PCT Pub. No.: WO2018/046547
PCT Pub. Date: Mar. 15, 2018

(65) Prior Publication Data
US 2019/0211800 A1 Jul. 11, 2019

(30) Foreign Application Priority Data
Sep. 7, 2016 (EP) .................................. 16187662

(51) Int. Cl.
*F03D 1/06* (2006.01)
(52) U.S. Cl.
CPC ......... *F03D 1/0675* (2013.01); *F03D 1/0633* (2013.01); *F05B 2240/122* (2013.01); *Y02E 10/72* (2013.01)

(58) Field of Classification Search
CPC .............................. F03D 1/0685; F03D 1/0633
See application file for complete search history.

(56) References Cited

U.S. PATENT DOCUMENTS

| | | | |
|---|---|---|---|
| 2007/0224416 A1 | 9/2007 | Matsubayashi et al. | |
| 2012/0257979 A1* | 10/2012 | Jensen | F03D 1/0675 416/223 R |

(Continued)

FOREIGN PATENT DOCUMENTS

| | | |
|---|---|---|
| CN | 102734059 A | 10/2012 |
| CN | 105275740 A | 1/2016 |

(Continued)

OTHER PUBLICATIONS

International Search Report dated Nov. 10, 2017 issued in corresponding International Application No. PCT/EP2017/072367.

(Continued)

*Primary Examiner* — Woody A Lee, Jr.
(74) *Attorney, Agent, or Firm* — Nath, Goldberg & Meyer; Jerald L. Meyer; Tanya E. Harkins

(57) ABSTRACT

A vortex generator device for a wind turbine blade, and a wind turbine blade is disclosed, the vortex generator device comprising a base with an inner side and an outer side, and a first fin protruding from the outer side and extending along a first fin axis, wherein the vortex generator device is a single-fin vortex generator device, and the base has a first edge part and a second edge part, the first edge part and the second edge part forming a primary angle in the range from 5 degrees to 60 degrees.

18 Claims, 7 Drawing Sheets

(56) References Cited

U.S. PATENT DOCUMENTS

| | | | |
|---|---|---|---|
| 2014/0328687 A1 | 11/2014 | Tobin et al. | |
| 2016/0017864 A1* | 1/2016 | Grabau | F03D 1/0633 |
| | | | 416/235 |
| 2016/0327021 A1* | 11/2016 | Tobin | F03D 1/0675 |
| 2017/0248116 A1* | 8/2017 | Fukami | F03D 1/0675 |

FOREIGN PATENT DOCUMENTS

| | | | | |
|---|---|---|---|---|
| DE | 102011122140 A1 * | 6/2013 | | F03D 1/0633 |
| DE | 102011122140 A1 | 6/2013 | | |
| EP | 2484897 A1 | 8/2012 | | |
| EP | 2975259 A1 | 1/2016 | | |
| EP | 3020964 A1 | 5/2016 | | |

OTHER PUBLICATIONS

Rejection Decision dated Mar. 3, 2021 corresponding to Chinese Application No. 201780054672.2.

* cited by examiner

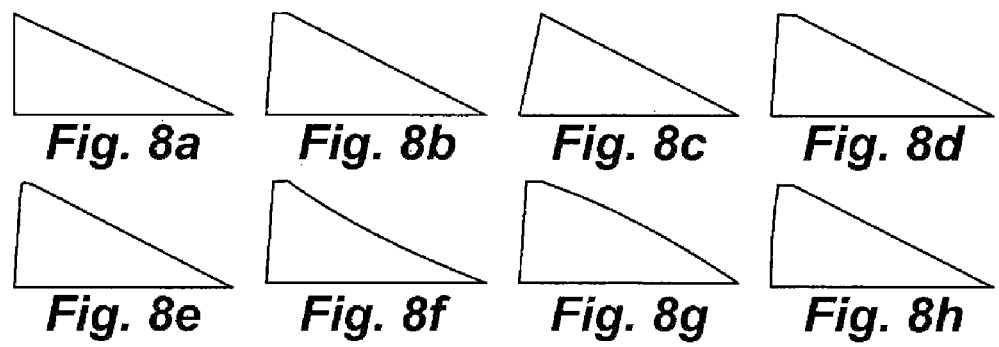
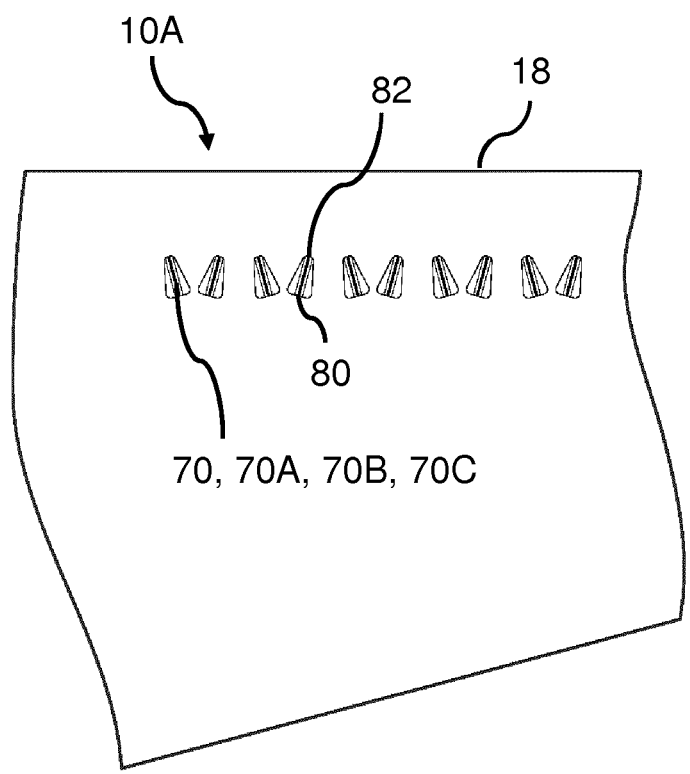
Fig. 9

VORTEX GENERATOR DEVICE FOR A WIND TURBINE BLADE

This is a National Phase Application filed under 35 U.S.C. 371 as a national stage of PCT/EP2017/072367, filed Sep. 6, 2017, an application claiming the benefit of European Application No. 16187662.8, filed Sep. 7, 2016, the content of each of which is hereby incorporated by reference in its entirety.

TECHNICAL FIELD

The present disclosure relates to a vortex generator device for a wind turbine blade and in particular for mounting on an outer surface of a wind turbine blade. Further, the present disclosure relates to a wind turbine blade with one or more vortex generators mounted on a surface thereof.

BACKGROUND

In the strive for developing more effective wind turbines, it is known to improve the aerodynamic properties of wind turbine blades by providing vortex generator devices on a surface of the wind turbine blade.

EP 2 975 259 A1 shows a single-fin vortex generator device with a base having a curved edge.

DE 10 2011 122140 A1 discloses a vortex generator having a support provided with a wing.

EP 3 020 964 A1 discloses a vortex generator located at the surface of a rotor blade such that lightning is guided to a lightning receptor by the vortex generated by the vortex generator.

Despite the known vortex generator devices, there is still a need to develop vortex generator devices and wind turbine blade having vortex generator device mounted thereon with high design flexibility, improved mounting strength and/or aerodynamic properties.

SUMMARY

Accordingly, there is a need for vortex generator devices and wind turbine blade that will facilitate or provide improved mounting strength of the vortex generator device. Further, it is an object of the invention to provide devices which address the above problems, in particular providing improved and/or uniform mounting strength of vortex generator device.

A vortex generator device for a wind turbine blade is disclosed, the vortex generator device comprising a base with an inner side and an outer side; and a first fin protruding from the outer side and extending along a first fin axis.

The vortex generator device may be a single-fin vortex generator device, i.e. the vortex generator device only has one fin. A single-fin vortex generator device increases the design freedom of the designer of the wind turbine blade with respect to position and configuration of a vortex generator device system.

Also disclosed is a vortex generator device for a wind turbine blade, the vortex generator device comprising a base with an inner side and an outer side; a first fin protruding from the outer side and extending along a first fin axis, the first fin having a first primary end and a first secondary end; and a second fin protruding from the outer side and extending along a second fin axis, the second fin having a second primary end and a second secondary end with a primary distance between the first primary end of the first fin and the second primary end of the second fin, and a secondary distance between the first secondary end of the first fin and the second secondary end of the second fin, wherein the primary distance is larger than the secondary distance. The first fin has a first primary fin height at the first primary end, and a first secondary fin height at the first secondary end, wherein the first primary fin height is optionally smaller than the first secondary fin height.

The base may be symmetric about the first fin axis. The base has an edge comprising one or more edge parts including a first edge part and/or a second edge part. The first edge part and the second edge part may be straight. The first edge part and the second edge part may form a primary angle in the range from 5 degrees to 60 degrees. The first edge part and the second edge part being straight and/or the primary angle being in the range from 5 to 60 degrees may provide for easy alignment of the vortex generator, as edge parts may be aligned with the wind turbine blade, such as perpendicular to the longitudinal direction of the wind turbine blade.

The first edge part may have a first length also denoted L1 larger than 10 mm, such as in the range from 20 mm to 140 mm.

The second edge part may have a second length also denoted L2 larger than 10 mm, such as in the range from 20 mm to 140 mm.

The primary angle between the first edge part and the second edge part may be in the range from 5 degrees to 30 degrees, such as in the range from 15 degrees to 30 degrees, preferably 24 degrees.

The first fin extends along a first fin axis, the first fin axis being parallel to the base. A first primary fin angle between the first edge part and the first fin axis may be in the range from 5 degrees to 30 degrees, such as in the range from 5 degrees to 20 degrees, preferably 12 degrees. One or more exemplary vortex generator devices may have a first primary fin angle in the range from 0.4*V1 to 0.6*V1, such as 0.5*V1, where V1 is the primary angle between the first edge part and the second edge part.

A first secondary fin angle between the second edge part and the first fin axis may be in the range from 5 degrees to 30 degrees, such as in the range from 5 degrees to 20 degrees, preferably 12 degrees. One or more exemplary vortex generator devices may have a first secondary fin angle in the range from 0.4*V1 to 0.6*V1, such as 0.5*V1, where V1 is the primary angle between the first edge part and the second edge part. In other words, the fin may be substantially centred between the first edge part and the second edge part.

First fin angles larger than 5 degrees between the first/second edge part and the first fin axis entails that one of the first or second edge parts is substantially perpendicular to the leading edge of the wind turbine blade when mounted on the wind turbine blade, i.e. substantially parallel with the air flow, in turn reducing noise or other undesired turbulence effects.

The vortex generator device disclosed herein enable precise and/or simple mounting of the vortex generator device on a wind turbine blade with reduced risk of mounting errors, such as weak bonding of the vortex generator device to the wind turbine blade. Further, the base of the vortex generator device makes the mounting of vortex generator devices more robust and/or reduce noise effects in wind turbine blades.

The vortex generator device may be made of or at least comprise wood, aluminium or stainless steel. However, according to an advantageous embodiment, the flow-altering device is made of or at least comprises a polymer material, such as TPU, PBT, PET or LDPE. The vortex generator device may also be made of polycarbonate (PC) or a combination of PBT and PC. Accordingly, the vortex generator device may according to an advantageous embodiment be moulded.

The edge of the base may comprise a third edge part. The third edge part is optionally intended to face the trailing edge of the wind turbine blade and may also be denoted trailing edge part. The third edge part may form a first secondary angle with the first edge part, wherein the first secondary angle optionally is in the range from 45 degrees to 120 degrees, such as in the range from 70 degrees to 85 degrees. The third edge part may form a second secondary angle with the second edge part, wherein the second secondary angle is optionally in the range from 45 degrees to 120 degrees, such as in the range from 70 degrees to 85 degrees. The difference between the first secondary angle and the second secondary angle may be less than 10 degrees, e.g. less than 5 degrees, thus facilitating a substantially base-symmetric vortex generator device. A base-symmetric vortex generator device can be used both as a first fin and a second fin of a fin pair. The third edge part may be perpendicular to the first fin axis. The third edge part may be straight. The third edge part may have a third length also denoted L3 larger than 5 mm, such as in the range from 10 mm to 80 mm. In one or more exemplary vortex generator devices, the third length is at least 0.5 times the maximum fin height, such as in the range from 0.7 to 1.5 times the maximum fin height.

The inner side of the base or at least a part thereof may be concave. Thus, the inner side may comprise a concave surface part. Accordingly, the vortex generator device may be adapted to conform to a curved surface, such as the surface of a wind turbine blade. The entire base, i.e. both the inner side and the outer side, may of course be curved, but the two sides need not have the same curvature. The curvature may be set as an average of the curvature of blade sections, for which the devices are intended so as to be precurved to fit to a large number of different blades and/or blade sections.

The edge of the base may comprise a fourth edge part. The fourth edge part may be straight. The straight fourth edge part may have a fourth length also denoted L4 larger than 1 mm, such as in the range from 3 mm to 10 mm. The fourth edge part may be perpendicular to the first fin axis.

The edge of the base may comprise one or more corner edge parts, a corner edge part connecting two straight or substantially straight edge parts. The one or more corner edge parts may comprise a first leading corner edge part between the first edge part and the fourth edge part or between the first edge part and the second edge part. The one or more corner edge parts may comprise a first trailing corner edge part between the first edge part and the third edge part or between the first edge part and the second edge part. The one or more corner edge parts may comprise a second leading corner edge part between the second edge part and the fourth edge part. The one or more corner edge parts may comprise a second trailing corner edge part between the second edge part and the third edge part. A corner edge part, such as the first leading corner edge part and/or the first trailing corner edge part and/or the second leading corner edge part and/or the second trailing corner edge part, may be curved. For example, a corner edge part, such as the first leading corner edge part and/or the first trailing corner edge part and/or the second leading corner edge part and/or the second trailing corner edge part, may have a radius of curvature in the range from 3 mm to 20 mm, such as in the range from 10 mm to 15 mm. The first and second leading edge corner parts may have the same radius of curvature. The first and second trailing edge corner parts may have the same radius of curvature, optionally being the same or different from the radius of curvature for the first and second leading edge corner parts. Curved corners may provide for a better airflow across the base of the vortex generator, e.g. the curved corners may improve the aerodynamic properties of the base of the vortex generator.

The width of the base is the maximum edge distance of the base perpendicular to the first fin axis and the length of the base is the maximum edge distance of the base parallel to the first fin axis. The width of the base may be at least 0.8 times the maximum fin height, such as in the range from 1.0. to 1.5 times the maximum fin height. The width of the base may be less than 2 times the maximum fin height. The width of the base may be in the range from 20 mm to 80 mm.

The first fin has a first primary end and a second primary end and having a fin length of at least 0.5 times the length of the base (distance between edge parts) in the direction of the first fin axis. One or more exemplary vortex generator devices has a fin length of at least 0.8 times the length of the base. The fin length also denoted Lfin may be in the range from 35 mm to 130 mm.

The vortex generator device may comprise an adhesive material on the inner side of the base. The adhesive material may comprise an adhesive tape, such as a double adhesive tape. The adhesive material may be covered by a peel-off layer. Thereby, the adhesive material may be protected in order to maintain the adhesive properties of the adhesive material until the vortex generator device is mounted on a wind turbine blade. The adhesive material may comprise a layer of compressible material that may be used for compensating for variations so as to exactly fit to the curvature of the wind turbine blade.

The adhesive material has adhesive properties, shape and size (area) providing sufficient adhesive strength for securely mounting the vortex generator device on the surface of the wind turbine blade. The adhesive material may be a pressure-sensitive material or tape, thereby providing a simple solution when fitting the vortex generator device to the surface of a wind turbine blade, as the worker only has to apply pressure to the outer side of the base and/or to the fin of the vortex generator device. The adhesive material may be acrylic based, e.g. an acrylic foam tape. The adhesive material may have a thickness in the range from 0.5 mm to 3 mm, preferably in the range from 0.5 mm to 1.5 mm.

The adhesive material may have one or more slits or cut-outs, e.g. for reducing air bubble formation between the base/vortex generator device and the surface of the wind turbine blade. The one or more slits or cut-outs may be made in the adhesive material/tape to reduce the risk of air being trapped inside the tape during mounting by reducing the maximum distance for adhesive material surface points to an edge of the adhesive material. When the adhesive material/tape is pressed towards the blade surface, the adhesive material tends to bond along the edge of the adhesive material, which then functions as a sealing where air in the middle of the adhesive material cannot escape. The one or more slits, such as a first slit, secure that the air can leave, thus improving the bonding quality. A slit may have a constant or varying width. A slit may have a depth of at least 10 mm. In one or more exemplary flow-altering devices, a slit, e.g. the first slit, and/or at least one channel extends from the third edge part (trailing edge part) of the flow-altering device to reduce the risk of water or debris being caught in the recess. The first slit may be straight or curved. In one or more exemplary vortex generator devices, the first slit is straight and parallel (±5 degrees) with the first fin axis.

The adhesive material may be V-shaped, E-shaped, U-shaped or trident-shaped, e.g. for reducing air bubble formation between the vortex generator device and the surface of the wind turbine blade. The adhesive material may comprise a first part, optionally having a primary portion with one or more leg portions extending from the primary portion. A first leg portion and a second leg portion of the one or more leg portions may be parallel or angled, e.g. at least 5 degrees. A leg portion may be straight. The adhesive material may comprise a second part, e.g. separated from the first part by a channel or at least a channel section of the channel. The adhesive material may comprise a third part, e.g. separated from the first part and/or the second part by a channel or at least channel section(s) of the channel. A first part and a second part of the adhesive material may form or be separated by a channel or gap there between. A channel or channel sections of a channel between different parts of the adhesive material may prevent or at least reduce the risk of water being trapped between the surface of the wind turbine blade and the flow-altering device during operation of the wind turbine blade and thus operating as a drainage channel. A first channel section of a channel formed in the adhesive material may extend from the first side edge of the vortex generator device. A second channel section of a channel formed in the adhesive material may extend from the second side edge of the vortex generator device. A third channel section of a channel formed in the adhesive material may extend from the third side edge of the vortex generator device.

In one or more exemplary vortex generator devices, the inner side of the base may be provided with a first recess or undercut for obtaining the adhesive material. Thereby, the adhesive material, e.g. in form of an adhesive tape, may be inserted into the first recess or undercut so that the surrounding parts of the inner side of the base protects the adhesive material, once the vortex generator device is mounted on the surface of a wind turbine blade, since the surrounding parts may contact the blade. Accordingly, the need for subsequently sealing the edge parts of the base may be reduced or eliminated. Further, a recess may allow for use of a thicker adhesive material, which may reduce the material costs and/or allows high design freedom in selection of adhesive material.

Table 1 below show parameter values for exemplary single-fin vortex generator devices VG20, VG30, VG40 and VG50 according to the present invention, where width is the maximum edge distance of the base perpendicular to the first fin axis and length is the maximum edge distance of the base parallel to the first fin axis.

|  | VG20 | VG30 | VG40 | VG50 |
|---|---|---|---|---|
| L1 | 34 mm | 50 mm | 67 mm | 84 mm |
| L2 | 34 mm | 50 mm | 67 mm | 84 mm |
| L3 | 16 mm | 24 mm | 32 mm | 40 mm |
| L4 | 2 mm | 2.9 mm | 3.8 mm | 4.8 mm |
| Lfin | 40 mm | 62 mm | 84 mm | 104 mm |
| W1 | 12 degrees | 12 degrees | 12 degrees | 12 degrees |
| W2 | 12 degrees | 12 degrees | 12 degrees | 12 degrees |
| Width | 25 mm | 39 mm | 52 mm | 64 mm |
| Length | 42 mm | 64 mm | 86 mm | 106 mm |
| R1 | 5 mm | 7.5 mm | 10 mm | 12.5 mm |
| R2 | 5 mm | 7.5 mm | 10 mm | 12.5 mm |
| R3 | 5 mm | 7.5 mm | 10 mm | 12.5 mm |
| R4 | 5 mm | 7.5 mm | 10 mm | 12.5 mm |

BRIEF DESCRIPTION OF THE DRAWINGS

The invention is explained in detail below with reference to one or more examples shown in the drawings, in which
FIGS. 8a-h show different shapes of a first fin and/or a second fin for vortex generator devices according to the invention,
FIG. 9 shows a wind turbine blade with vortex generator devices mounted on a surface thereof.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three wind turbine blades 10 extending radially from the hub 8, each having a blade root 16 nearest the hub and a blade tip 14 furthest from the hub 8. The rotor has a radius denoted R.

FIG. 2 shows a schematic perspective view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

Figure 1:
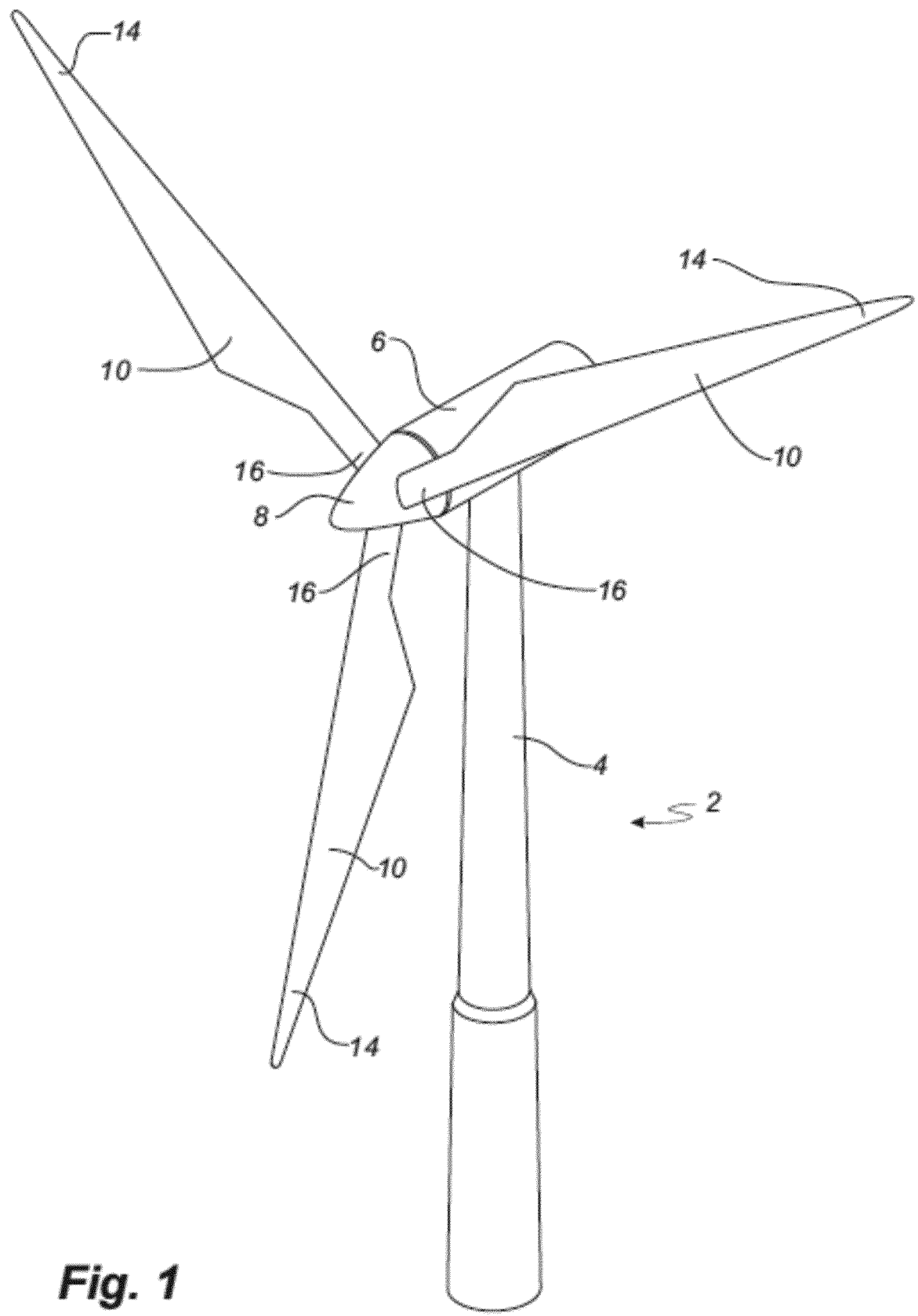
FIG. 1 shows a schematic view of a wind turbine.
Figure 2:
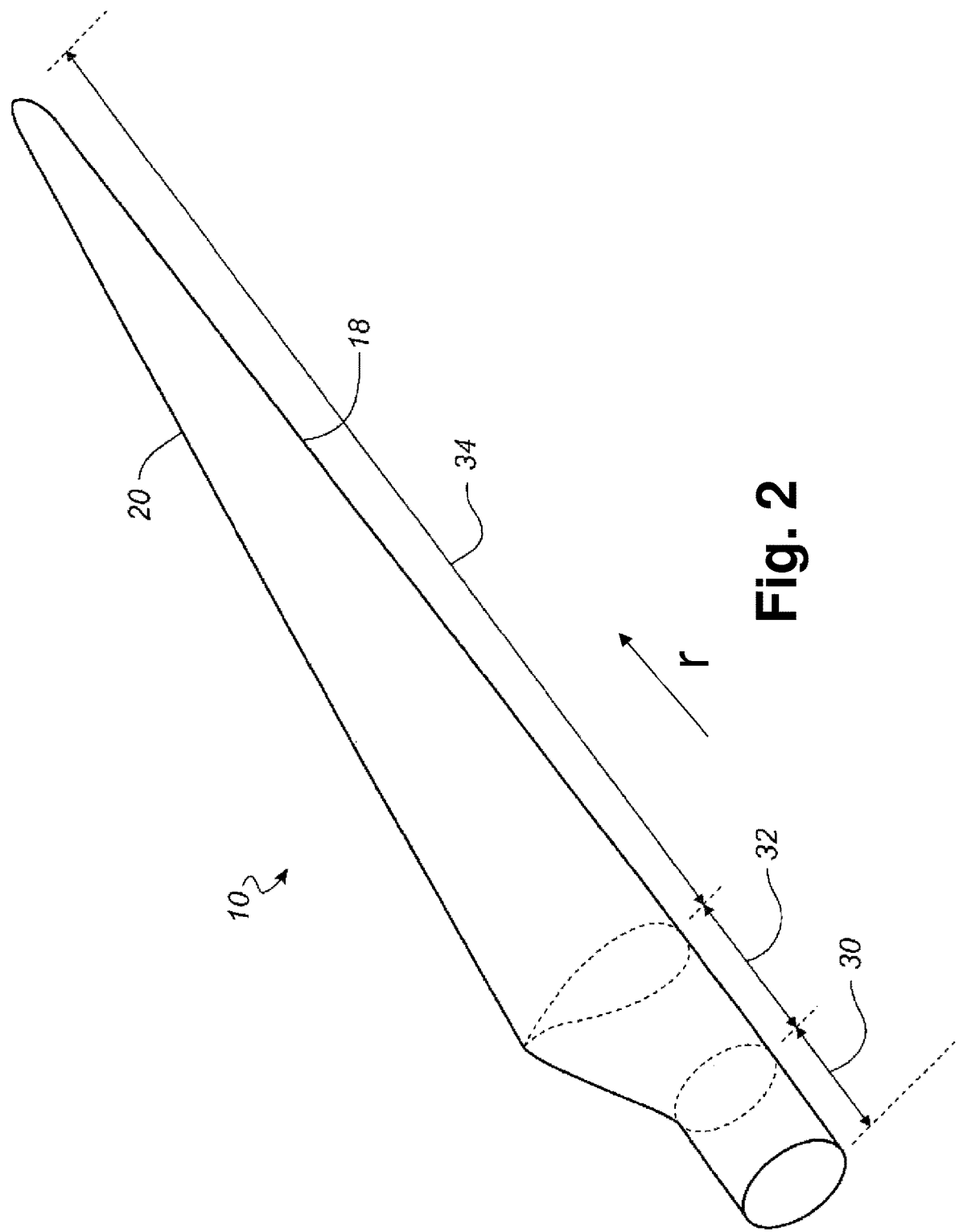
FIG. 2 shows a schematic perspective view of a wind turbine blade.

The airfoil region 34 (also called the profiled region) has an ideal or almost ideal blade shape with respect to generating lift, whereas the root region 30 due to structural considerations typically has a substantially circular or elliptical cross-section, which for instance makes it easier and safer to mount the blade 10 to the hub. The diameter (or the chord) of the root region 30 is typically constant along the entire root area 30. The transition region 32 has a transitional profile gradually changing from the circular or elliptical shape of the root region 30 to the airfoil profile of the airfoil region 34. The chord length of the transition region 32 typically increases substantially linearly with increasing distance r from the hub.

The airfoil region 34 has an airfoil profile with a chord extending between the leading edge 18 and the trailing edge 20 of the blade 10. In the airfoil region 34, the width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this most often being the case in order to compensate for the local velocity of the blade being dependent on the radius from the hub.

Figure 3:
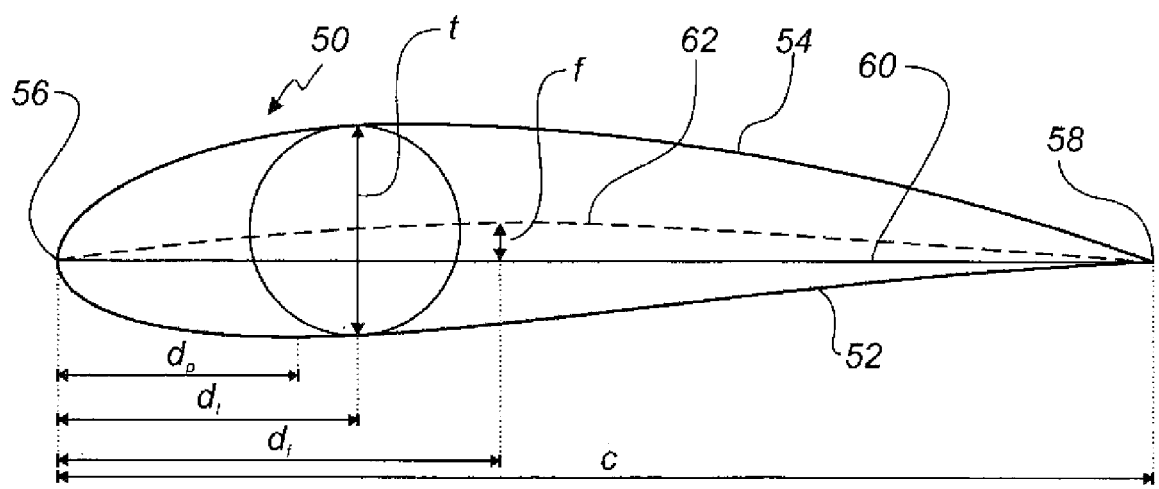
FIG. 3 shows a schematic view of an airfoil profile.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally faces towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position dr of the maximum camber f, the maximum airfoil thickness t, which is the largest diameter of the inscribed circles along the median camber line 62, the position dr of the maximum thickness t, and a nose radius (not shown).

These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

Figure 4:
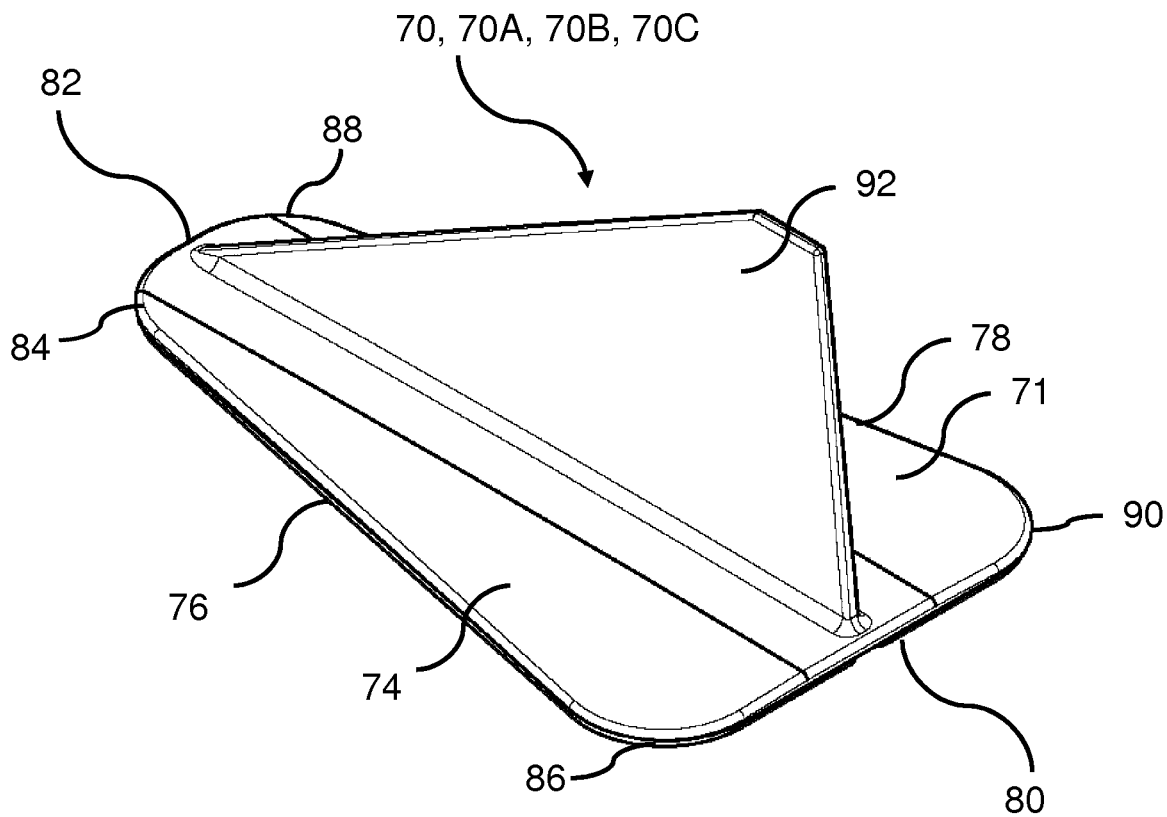
FIG. 4 shows a schematic first perspective view of exemplary vortex generator devices according to the present invention.

FIG. 4 shows a schematic perspective view of exemplary vortex generator devices according to the invention. The vortex generator device is a single-fin vortex generator device 70, 70A, 70B, 70C comprising a base 71 having (when mounted to an exterior of the wind turbine blade), a concave inner side (not shown) for attaching to the exterior of the wind turbine blade, and an outer side 74 facing away from the exterior of the wind turbine blade. The base 71 has an edge comprising a first edge part 76, a second edge part 78, a third edge part 80 (or trailing edge part), and a fourth edge part 82 (or leading edge part). The base 71 is generally trapezium-shaped so that the third edge part 80 is straight and parallel to the straight fourth edge part 82 and so that a length of the fourth edge part 82 of the base 71 is smaller than a length of the third edge part 80 of the base 71.

The edge of the base comprises one or more corner edge parts, a corner edge part connecting two straight or substantially straight edge parts. The one or more corner edge parts comprises a first leading corner edge part 84 between the first edge part 76 and the fourth edge part 82, a first trailing corner edge part 86 between the first edge part 76 and the third edge part 80, a second leading corner edge part 88 between the second edge part 78 and the fourth edge part 82, and a second trailing corner edge part 90 between the second edge part 78 and the third edge part 80. The vortex generator device 70 has a single first fin 92, also called vane, which protrude from the outer side 74 of the base 71.

Figure 5:
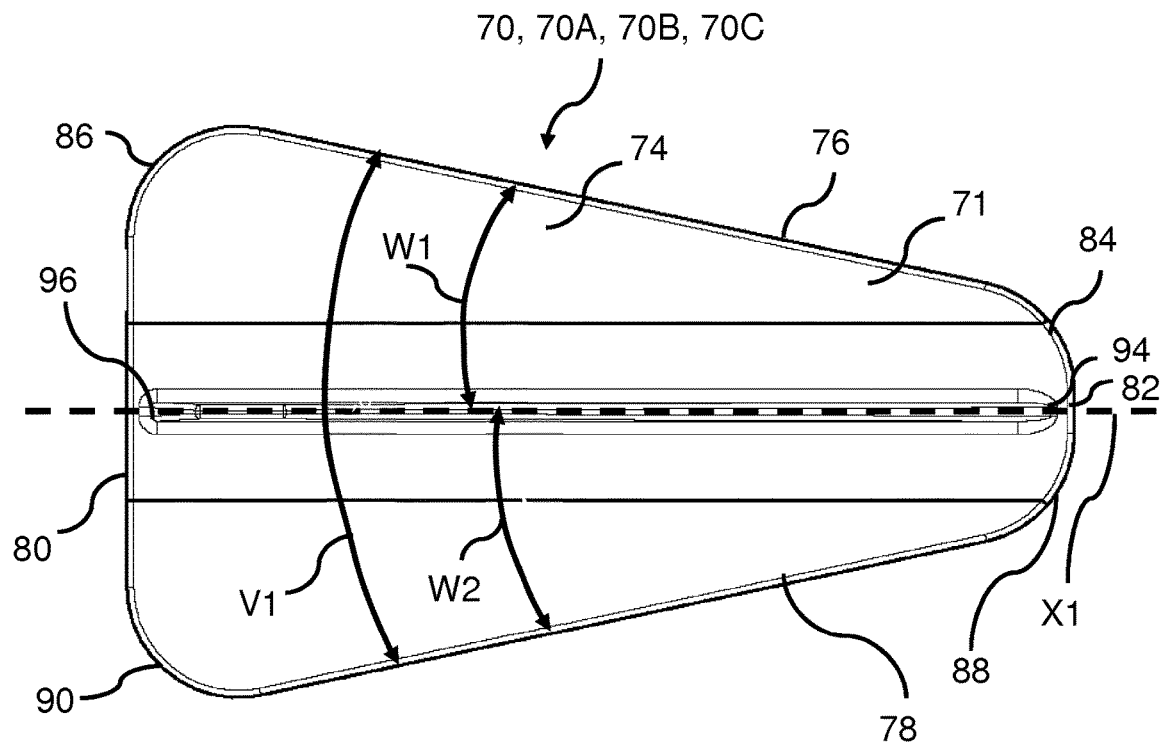
FIG. 5 shows a schematic outer side view of the vortex generator devices in FIG. 4.

FIG. 5 shows an outer side view of the vortex generator devices 70, 70A, 70B, 70C. The first fin 84 protrudes from the outer side 74 and extends along a first fin axis X1, the first fin axis X1 being parallel to the base 71. The first edge part 76 and the second edge part 78 form a primary angle V1 in the range from 5 degrees to 30 degrees, namely 24 degrees as illustrated. The first primary fin angle W1 between the first edge part 76 and the first fin axis X1 is in the range from 5 degrees to 30 degrees, namely 12 degrees as illustrated. The first secondary fin angle W2 between the second edge part 78 and the first fin axis X1 is in the range from 5 degrees to 30 degrees, namely 12 degrees as illustrated. The corner edge parts 84, 86, 88, 90 have each have a radius of curvature (also denoted R1, R2, R3, R4) in the range from 3 mm to 20 mm, namely 12.5 mm as illustrated. The first fin has a first primary end 94 and a second primary end 96 and having a fin length of at least 95% of the length of the base (distance between edge parts 82, 84) in the direction of the first fin axis.

Figure 6:
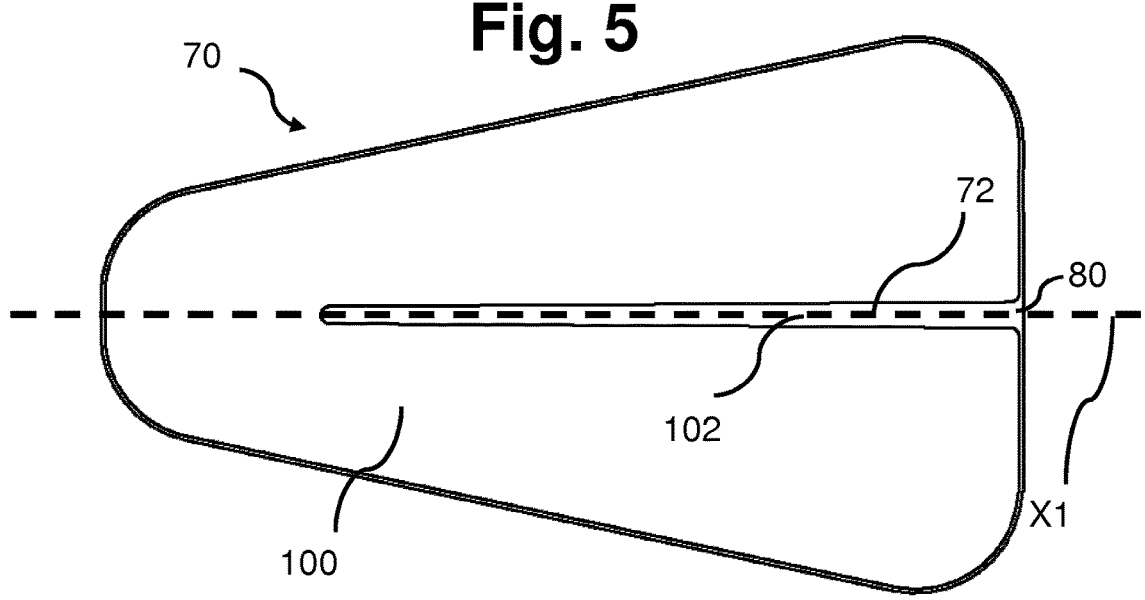
FIG. 6 shows a schematic inner side view of an exemplary vortex generator device.

FIG. 6 shows an inner side view of the vortex generator device 70 with an adhesive material 100 arranged on the inner side 72 of the base. The adhesive material 100 extends to edge of the base and has a first slit 102 for reducing air bubble formation between the vortex generator device 70 and the surface of the wind turbine blade when the vortex generator device 70 is mounted on a wind turbine blade. This is in particular advantageous when the inner side 72 is curved. The first slit 102 extends from the third edge part 80 (trailing edge part) parallel to the first fin axis X1 in order to reduce the risk of water or debris being caught in the first slit 102 during operation of the wind turbine blade.

Figure 7A:
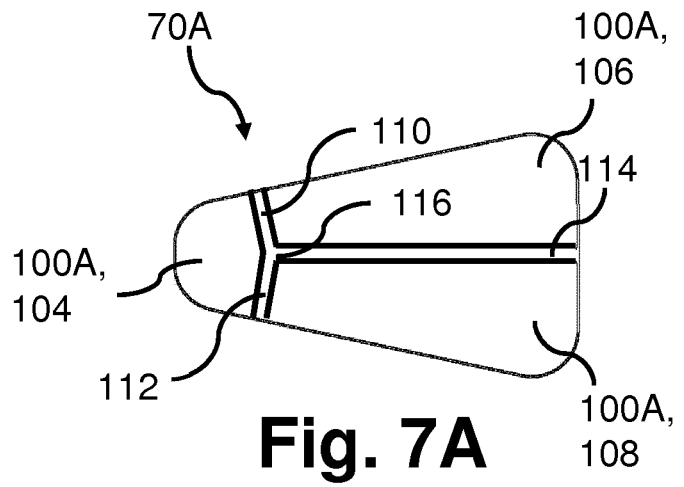
FIG. 7A shows a schematic inner side view of an exemplary vortex generator device.

FIG. 7A shows an inner side view of the vortex generator device 70A with an adhesive material 100A arranged on the inner side 72 of the base. The adhesive material 100A comprises a first part 104, a second part 106 and a third part 108, wherein the parts of the adhesive material are separated by different channel sections 110, 112, 114 of a channel formed between the adhesive material parts 104, 106, 108. In addition to reducing the formation of air bubbles, the channel sections 110, 112, 114 between different parts of the adhesive material prevents or at least reduces the risk of water being trapped between the surface of the wind turbine blade and the vortex generator device during operation of the wind turbine blade. The first channel section 110 extends from the first edge part 76 of the vortex generator device 70A. The second channel section 112 extends from the second edge part 78 of the vortex generator device 70A. The third channel section 114 extends from the third edge part of the vortex generator device 70A. Proximal ends of the channel sections 110, 112, 114 are connected to each other in channel node 116.

Figure 7B:
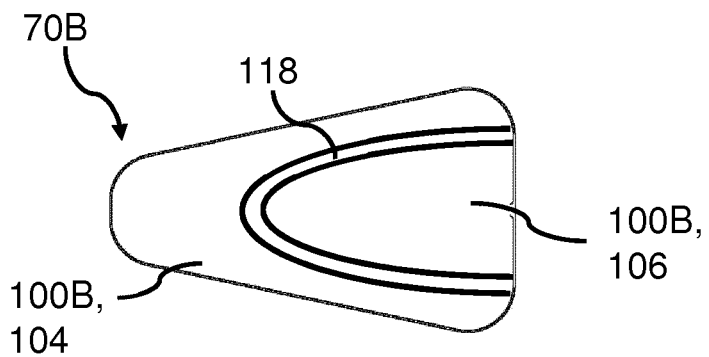
FIG. 7B shows a schematic inner side view of an exemplary vortex generator device.

FIG. 7B shows an inner side view of the vortex generator device 70B with an adhesive material 100B arranged on the inner side 72 of the base. The adhesive material 100B comprises a first part 104 and a second part 106 separated by a curved channel 118 having ends at the third edge part of the vortex generator device 70B. It is to be understood that a combination of one or more slits and a channel/channel sections may be employed.

Figure 7C:
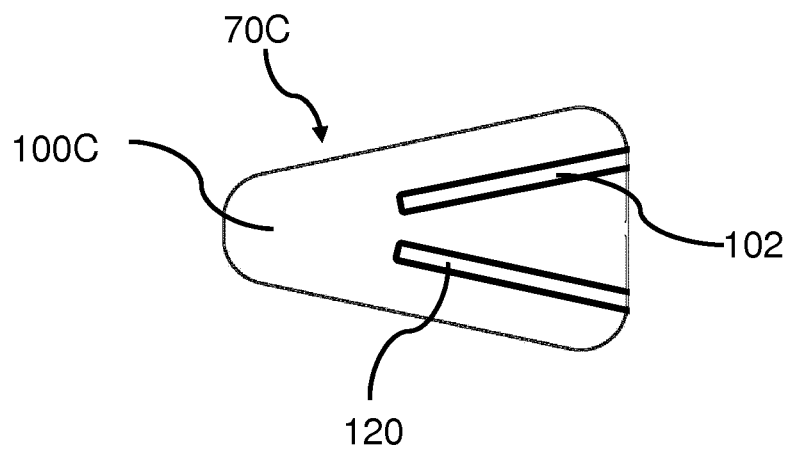
FIG. 7C shows a schematic inner side view of an exemplary vortex generator device.

FIG. 7C shows an inner side view of the vortex generator device 70C with an adhesive material 100C arranged on the inner side 72 of the base. The adhesive material 100C has a first slit 102 and a second slit 120 extending from the third edge part of the vortex generator device 70C for reducing air bubble formation between the flow-altering device and the surface of the wind turbine blade when the vortex generator device is mounted on a wind turbine blade. The first slit 102 is parallel with the first edge part of the base of the vortex generator device, and the second slit 120 is parallel with the second edge part of the base of the vortex generator device 70C.

FIGS. 8*a-h* show different shapes of the first fin and/or second fin. It is recognised that the fin(s) may have various shapes. Thus, the first fin may for instance has a shape as a right triangle as shown in FIG. 8*a*, or it may comprise a tapered second edge part with a flattened top as shown in FIG. 8*b* or without a flattened top in FIG. 8*c*. The first fin may also comprise an intermediate edge portion having a different tapering angle as shown in FIG. 8*d*, or a rounded top edge portion as shown in FIG. 8*e*. The first or leading edge part of the fin may be straight as shown in FIGS. 8*a-e*, or concave as shown in FIG. 8*f* or convex as shown in FIG. 8*g*. The first or leading edge part of the fin may comprise both concave and convex segments (not shown). The trailing edge part of the fin may also be concave or convex as shown in FIG. 8*h*. The second and/or the trailing edge part of the first fin may comprise both concave and convex segments (not shown).

FIG. 9 shows a part of a wind turbine blade with vortex generator devices mounted on a surface thereof. The wind turbine blade 10A comprises ten single-fin vortex generator devices arranged in five VG pairs with the fourth side 82 facing the leading edge 18 of the wind turbine blade 10A. It is to be noted that the single-fin vortex generator devices can be freely arranged both with respect to number and position.

Figure 10:
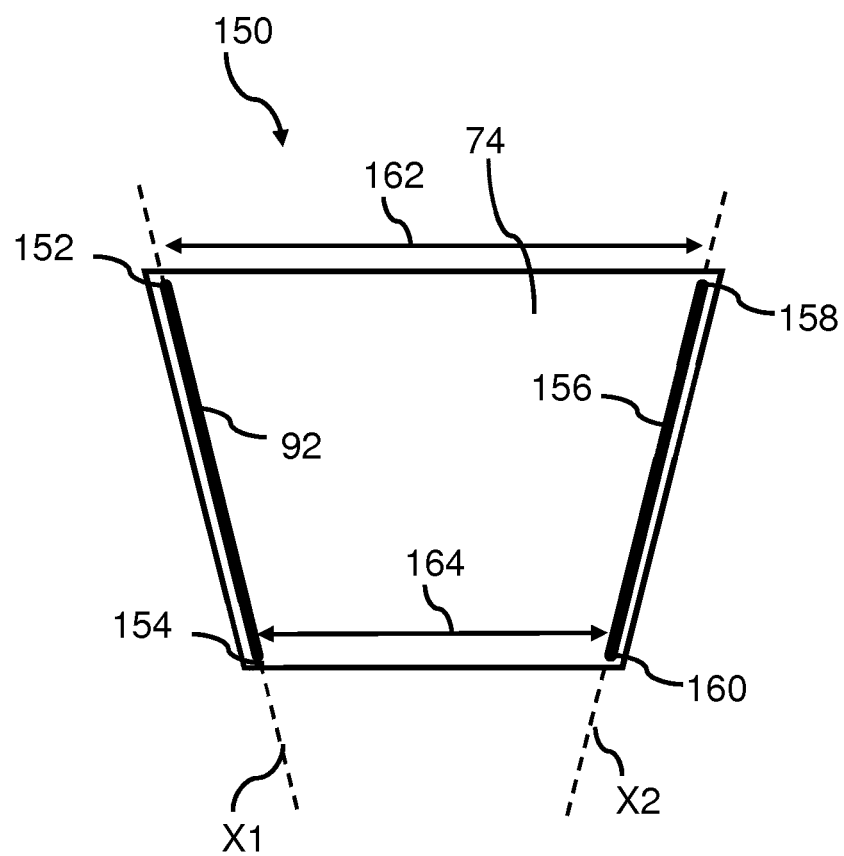
FIG. 10 shows a schematic outer side view of an exemplary vortex generator device according to the present invention.

FIG. 10 shows an outer side view of a converging double-fin vortex generator device for a wind turbine blade. The vortex generator device 150 comprises a base 71 with an inner side and an outer side 74; a first fin 92 protruding from the outer side 74 and extending along a first fin axis X1, the first fin 92 having a first primary end 152 and a first secondary end 154; and a second fin 156 protruding from the outer side 74 and extending along a second fin axis X2, the second fin 156 having a second primary end 158 and a second secondary end 160 with a primary distance 162 between the first primary end 152 of the first fin and the second primary end 158 of the second fin, and a secondary distance 164 between the first secondary end of the first fin and the second secondary end of the second fin, wherein the primary distance 162 is larger than the secondary distance 164. The first fin 92 has a first primary fin height at the first primary end 152 and a first secondary fin height at the first secondary end 154. The first primary fin height is smaller than the first secondary fin height, such as less than half the first secondary fin height.

The second fin 156 has a second primary fin height at the second primary end 158 and a second secondary fin height at the second secondary end 160. The second primary fin height is smaller than the second secondary fin height, such as less than half the second secondary fin height.

LIST OF REFERENCES 2 wind turbine
4 tower
6 nacelle
8 hub
10, 10A wind turbine blade
14 blade tip
16 blade root
18 leading edge
20 trailing edge
30 root region
32 transition region
34 airfoil region
50 airfoil profile
52 pressure side
54 suction side
56 leading edge
58 trailing edge
60 chord
62 camber line
70, 70A, 70B, 70C vortex generator device
71 base
72 inner side
74 outer side
76 first edge part
78 second edge part
80 third edge part
82 fourth edge part
84 first leading corner edge part
86 first trailing corner edge part
88 second leading corner edge part
90 second trailing corner edge part
92 first fin
94 first primary end
96 first secondary end
100, 100A, 100B, 100C adhesive material
102 first slit
104 first part of adhesive material
106 second part of adhesive material
108 third part of adhesive material
110 first channel section
112 second channel section
114 third channel section
116 channel node
118 channel
120 second slit
150 vortex generator device
152 first primary end
154 first secondary end
156 second fin
158 second primary end
160 second secondary end
162 primary distance
164 secondary distance
X1 first fin axis
X2 second fin axis
V1 primary angle
W1 first primary fin angle between the first edge part and the first fin axis X1
W2 first secondary fin angle between the second edge part and the first fin axis X1
L1 length of first edge part
L2 length of second edge part
L3 length of third edge part
L4 length of fourth edge part
Lfin length of first fin
R1 radius of curvature for first leading corner edge part 84
R2 radius of curvature for first trailing corner edge part 86
R3 radius of curvature for second leading corner edge part 88
R4 radius of curvature for second trailing corner edge part 90

The invention claimed is:

1. A vortex generator device for a wind turbine blade, the vortex generator device comprising:
   a base with an inner side and an outer side;
   a first fin protruding from the outer side and extending along a first fin axis, wherein the vortex generator device is a single-fin vortex generator device, and the base has a first edge part and a second edge part, the first edge part and the second edge part being straight, the first edge part and the second edge part forming a primary angle in the range from 5 degrees to 60 degrees, and the base having a first leading corner edge part between the first edge part and the second edge part, the first leading corner edge part being curved; and an adhesive material on the inner side of the base, the adhesive material comprising an adhesive tape, wherein the adhesive material has a structure for reducing air bubble formation between the base and the wind turbine blade.

2. The vortex generator device according to claim 1, wherein the base has a third edge part forming a first secondary angle with the first edge part, wherein the first secondary angle is in the range from 45 degrees to 120 degrees.

3. The vortex generator device according to claim 2, wherein the third edge part forms a second secondary angle with the second edge part, wherein the second secondary angle is in the range from 45 degrees to 120 degrees.

4. The vortex generator device according to claim 1, wherein the inner side of the base is concave.

5. The vortex generator device according to claim 1, wherein a first primary fin angle between the first edge part and the first fin axis is in the range from 5 degrees to 30 degrees.

6. The vortex generator device according to claim 1, wherein a first secondary fin angle between the second edge part and the first fin axis is in the range from 5 degrees to 30 degrees.

7. The vortex generator device according to claim 1, wherein the base has a straight fourth edge part.

8. The vortex generator device according to claim 1, wherein a fin length of the first fin is at least 0.5 times the length of the base in the direction of the first fin axis.

9. The vortex generator device according to claim 1, wherein the adhesive tape, is covered by a peel-off layer.

10. The vortex generator device according to claim 9, wherein the structure of the adhesive material comprises one or more slits.

11. The vortex generator device according to claim 9, wherein the adhesive material is V-shaped, E-shaped, U-shaped or trident-shaped.

12. The vortex generator device according to claim 9, wherein the adhesive material comprises a first part and a second part, wherein the first part and the second part are separated by a channel.

13. The vortex generator device according to claim 9, wherein the adhesive tape comprises double adhesive tape.

14. The vortex generator device according to claim 9, wherein the adhesive material comprises a first part and a second part, and wherein the first part and the second part are separated by a channel section of a channel.

15. The vortex generator device according to claim 1, wherein the inner side of the base is provided with a first recess, wherein the first recess is V-shaped, E-shaped, U-shaped or trident-shaped.

16. The vortex generator device for a wind turbine blade according to claim 1, wherein the structure comprises one or more slits.

17. The vortex generator device for a wind turbine blade according to claim 1, wherein the structure comprises a channel, the adhesive material comprising a first part and a second part, the first part and the second part being separated from one another by the channel.

18. A vortex generator device for a wind turbine blade, the vortex generator device comprising:

a base with an inner side and an outer side;

a first fin protruding from the outer side and extending along a first fin axis, the first fin having a first primary chord end and a first secondary chord end, the first fin having a first primary fin height at the first primary chord end and a first secondary fin height at the first secondary chord end, the first primary fin height being smaller than the first secondary fin height; and a second fin protruding from the outer side and extending along a second fin axis, the second fin having a second primary chord end and a second secondary chord end with a primary distance between the first primary chord end of the first fin and the second primary chord end of the second fin, and a secondary distance between the first secondary chord end of the first fin and the second secondary chord end of the second fin, wherein the primary distance is larger than the secondary distance.

* * * * *